United States Patent
Cheng et al.

(10) Patent No.: US 12,110,227 B2
(45) Date of Patent: Oct. 8, 2024

(54) METHOD FOR RECOVERING LITHIUM BIS(FLUOROSULFONYL)IMIDE

(71) Applicants: CONTEMPORARY AMPEREX TECHNOLOGY CO., LIMITED, Fujian (CN); CATL-SICONG Novel Materials Co., Ltd, Fujian (CN)

(72) Inventors: Sicong Cheng, Fujian (CN); Qisen Huang, Fujian (CN)

(73) Assignees: CONTEMPORARY AMPEREX TECHNOLOGY CO., LIMITED, Ningde (CN); CATL-SICONG NOVEL MATERIALS CO., LTD, Longyan (CN)

(*) Notice: Subject to any disclaimer, the term of this patent is extended or adjusted under 35 U.S.C. 154(b) by 0 days.

(21) Appl. No.: 18/525,902

(22) Filed: Dec. 1, 2023

(65) Prior Publication Data

US 2024/0092639 A1 Mar. 21, 2024

Related U.S. Application Data

(63) Continuation of application No. PCT/CN2022/075012, filed on Jan. 29, 2022.

(51) Int. Cl.
  *C01B 21/086* (2006.01)
  *H01M 10/0525* (2010.01)
  *H01M 10/0568* (2010.01)

(52) U.S. Cl.
  CPC ....... *C01B 21/086* (2013.01); *H01M 10/0525* (2013.01); *H01M 10/0568* (2013.01)

(58) Field of Classification Search
  CPC ............ C01B 21/086; H01M 10/0525; H01M 10/0568
  See application file for complete search history.

(56) References Cited

U.S. PATENT DOCUMENTS

2020/0155964 A1   5/2020   Singh et al.

FOREIGN PATENT DOCUMENTS

| CN | 104787784 A | 7/2015 |
| CN | 106241757 A | 12/2016 |

(Continued)

OTHER PUBLICATIONS

Extended European Search Report issued Apr. 19, 2024 in European Patent Application No. 22922572.7.

(Continued)

*Primary Examiner* — Melissa S Swain
(74) *Attorney, Agent, or Firm* — XSENSUS LLP (57) ABSTRACT

A method for recovering lithium bis(fluorosulfonyl)imide is provided in the present application. The method of the present application may comprise: mixing a slag from lithium bis(fluorosulfonyl)imide production process with a solvent of carbonate ester, to obtain a mixed material; subjecting the mixed material to solid-liquid separation, to obtain a discharged liquid and a solid slag; monitoring the chromaticity of the discharged liquid and comparing the chromaticity of the discharged liquid with a chromaticity reference; recycling the discharged liquid to the mixed material, if the chromaticity of the discharged liquid is higher than the chromaticity reference; and recycling the discharged liquid to lithium bis(fluorosulfonyl)imide production process, if the chromaticity of the discharged liquid is lower than or equal to the chromaticity reference.

9 Claims, 2 Drawing Sheets

(56) References Cited

FOREIGN PATENT DOCUMENTS

| CN | 106659947 A | 5/2017 |
|---|---|---|
| CN | 108387674 A | 8/2018 |
| CN | 109835876 A | 6/2019 |
| CN | 110692160 A | 1/2020 |
| CN | 111874880 A | 11/2020 |
| CN | 112174101 A | 1/2021 |
| CN | 113582145 A | 11/2021 |
| CN | 113603069 A | 11/2021 |
| CN | 113800485 A | 12/2021 |
| FR | 3081720 A1 | 12/2019 |
| WO | 2019/229363 A2 | 12/2019 |
| WO | 2020/216736 A1 | 10/2020 |

OTHER PUBLICATIONS

International Search Report and Written Opinion mailed on Oct. 25, 2022, received for PCT Application PCT/CN2022/075012, filed on Jan. 29, 2021, 11 pages including English Translation.

First Office Action mailed on Sep. 5, 2022, received for CN Application 202210110593.1, 11 pages including English Translation.

Second Office Action mailed on Dec. 2, 2022, received for CN Application 202210110593.1, 7 pages including Concise Explanation of Relevance.

Zhang et al., "Research Progress in Synthesis and Application of Lithium Bisfluorosulfonylimide", Chemical Engineering Design Communications, Jan. 2020, pp. 140-141 (2 pages including English Abstract).

Zhang et al., "Research Situation of Waste Lithium-ion Battery Electrolyte Recycling", Zhejiang Chemical Industry, vol. 49, No. 8, 2018, pp. 12-15 (5 pages including English Abstract).

METHOD FOR RECOVERING LITHIUM BIS(FLUOROSULFONYL)IMIDE

CROSS-REFERENCE TO RELATED APPLICATION

The present application is a continuation of International Application No. PCT/CN2022/075012, filed Jan. 29, 2022, which is incorporated herein by reference in its entirety.

TECHNICAL FIELD

The present application belongs to the technical field of production in chemical industry, and in particular relates to a method for recovering lithium bis(fluorosulfonyl)imide from a slag from lithium bis(fluorosulfonyl)imide production process.

BACKGROUND ART

Lithium bis(fluorosulfonyl)imide having the chemical formula of $Li[N(SO_2F)_2]$, hereafter referred to as LiFSI as an abbreviation, is an important fluorine-containing lithium salt. Due to its special molecular structure, the compound has a low binding energy between $Li^+$ and $FSI^-$, which facilitates the disassociation of $Li^+$. Therefore the addition of LiFSI in the electrolyte solution of a secondary battery results in a higher electrical conductivity. LiFSI also has the properties of high thermal stability, a wide electrochemical window, and a low corrosion rate. By applying LiFSI, the cycling performance and rate performance of a traction battery can be improved, which makes this material a potential lithium salt for electrolyte in a lithium ion battery.

Currently, the restrictions in the processing conditions for the synthesizing of LiFSI lead to expansive production costs, and the conventional production process has the defects of scarce raw materials, cumbersome processes, a long procedure, a low product conversion rate, high energy consumption, environmental pollution, etc. In addition, as the electrolyte for a secondary lithium-ion battery, it has to satisfy harsh requirements, such as having high purity and being free of water. It is very difficult to remove the moisture content remaining in LiFSI by heating and drying even at the decomposition temperature, or it is only possible at the expense of a heavy loss in yield.

Thus it is a urgent problem for a person skilled in the art to recover residual LiFSI from the slag from LiFSI production process as much as possible and to improve the yield of LiFSI production process.

SUMMARY OF THE DISCLOSURE

In view of the above-mentioned problems in the prior art, the objective of the present application is to provide a method for recovering lithium bis(fluorosulfonyl)imide from the slag from LiFSI production process, in order to improve the yield of the LiFSI production process, achieve the maximized recovery and reuse and reduce environmental pollution.

In order to achieve the above objective, in an aspect, the present application provides a method for recovering LiFSI, comprising:

mixing a slag from LiFSI production process with a solvent of carbonate ester, to obtain a mixed material;
subjecting the mixed material to solid-liquid separation, to obtain a discharged liquid and a solid slag;
monitoring the chromaticity of the discharged liquid and comparing the chromaticity of the discharged liquid with a chromaticity reference;
recycling the discharged liquid to the mixed material, if the chromaticity of the discharged liquid is higher than the chromaticity reference; and
recycling the discharged liquid to the LiFSI production process, if the chromaticity of the discharged liquid is lower than or equal to the chromaticity reference.

Therefore, in the process of the present application for recovering LiFSI from the slag from the LiFSI production process by using a solvent of carbonate ester, information about the separation of LiFSI from other lithium salts in the slag, such as lithium sulphate ($Li_2SO_4$), lithium fluoride (LiF) and lithium sulphamate ($LiNH_2SO_3$), can be acquired by monitoring the chromaticity of the discharged liquid obtained by the solid-liquid separation. The discharged liquid is only recycled to the LiFSI production process, if the chromaticity of the discharged liquid is lower than or equal to a predetermined chromaticity reference, which enables the recycling of residual LiFSI in the slag back to the production process and achieves a maximized recovery and reuse of LiFSI. Moreover, the impurities in the recovered material containing LiFSI, such as lithium sulphate ($Li_2SO_4$), lithium fluoride (LiF) and lithium sulphamate ($LiNH_2SO_3$), have been thoroughly removed. The solid slag obtained from the recovering process can be further processed, in order to recover the lithium salts, such as lithium sulphate ($Li_2SO_4$), lithium fluoride (LiF) and lithium sulphamate ($LiNH_2SO_3$), thus making full use of the lithium resource and reducing environmental pollution.

In any embodiment, the chromaticity reference has a value of no more than 300 Hazen, optionally no more than 200 Hazen.

In any embodiment, the solvent of carbonate ester is one or more of diethyl carbonate (DEC), ethyl methyl carbonate (EMC), dimethyl carbonate (DMC), ethylene carbonate (EC), and propylene carbonate (PC).

In any embodiment, the mass ratio of the slag to the solvent of carbonate ester is 1:(1-5), optionally 1:(2-4).

In any embodiment, the solid-liquid separation is carried out by centrifugation.

In any embodiment, the solid-liquid separation is carried out by filtration.

In any embodiment, the single recovery rate of bis(fluorosulfonyl)imide is no less than 85%.

The method of the present application for recovering LiFSI from the slag from LiFSI production process is capable of improving the yield of the LiFSI production process, achieving the maximized recovery and reuse of LiFSI and reducing environmental pollution.

DETAILED DESCRIPTION OF EMBODIMENTS

Hereafter, implementations of the method for recovering lithium bis(fluorosulfonyl)imide of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed in the text, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or closed-ended, unless otherwise stated. For example, the terms "comprising" and "including" may mean that other components not listed may also be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

In the present application, a method for recovering lithium bis(fluorosulfonyl)imide is provided, comprising:
 mixing a slag from lithium bis(fluorosulfonyl)imide production process with a solvent of carbonate ester, to obtain a mixed material;
 subjecting the mixed material to solid-liquid separation, to obtain a discharged liquid and a solid slag;
 monitoring the chromaticity of the discharged liquid and comparing the chromaticity of the discharged liquid with a chromaticity reference;
 recycling the discharged liquid to the mixed material, if the chromaticity of the discharged liquid is higher than the chromaticity reference; and
 recycling the discharged liquid to the lithium bis(fluorosulfonyl)imide production process, if the chromaticity of the discharged liquid is lower than or equal to the chromaticity reference.

Although the mechanism is not yet clear, the applicant has unexpectedly discovered: the chromaticity of the LiFSI solution changes with the concentration of LiFSI and the presence of other lithium salts in the solution. A solution of LiFSI in a solvent of carbonate ester with a concentration of about 30 wt. % has a chromaticity of about 40. If other lithium salts, such as lithium sulphate ($Li_2SO_4$), lithium fluoride (LiF) and lithium sulphamate ($LiNH_2SO_3$), exist in the solution, the turbidity caused by these lithium salts will increase the chromaticity of the solution. During the solid-liquid separation of a mixed material formed by the slag from LiFSI production process and the solvent of carbonate ester, LiFSI is soluble in the solvent of carbonate ester and is contained in the discharged liquid, while the other lithium salts, such as lithium sulphate ($Li_2SO_4$), lithium fluoride (LiF) and lithium sulphamate ($LiNH_2SO_3$), are contained in the solid slag. During this procedure, the amount of residual LiFSI in the solid slag, the content of the other lithium salts, such as lithium sulphate ($Li_2SO_4$), lithium fluoride (LiF) and lithium sulphamate ($LiNH_2SO_3$), remaining in the discharged liquid, and the chromaticity of the solution all decrease with the completeness of the solid-liquid separation. Therefore, in the process for recovering LiFSI from the slag from the LiFSI production process by using a solvent of carbonate ester, information about the separation of LiFSI from other lithium salts in the slag, such as lithium sulphate ($Li_2SO_4$), lithium fluoride (LiF) and lithium sulphamate ($LiNH_2SO_3$), can be reflected by the chromaticity of the discharged liquid obtained by the solid-liquid separation.

The discharged liquid is only recycled to the LiFSI production process, if the chromaticity of the discharged liquid is lower than or equal to a predetermined chromaticity reference, which enables the recycling of residual LiFSI in the slag back to the production process and achieves a maximized recovery and reuse of LiFSI. Moreover, the impurities in the discharged recovered liquid, such as lithium sulphate ($Li_2SO_4$), lithium fluoride (LiF) and lithium sulphamate ($LiNH_2SO_3$), have been thoroughly removed. The solid slag obtained from the recovering process can be further processed, in order to recover the lithium salts, such as lithium sulphate ($Li_2SO_4$), lithium fluoride (LiF) and lithium sulphamate ($LiNH_2SO_3$), thus making full use of the lithium resource and reducing environmental pollution.

In the process of the present application for recovering LiFSI from the slag from the LiFSI production process by using a solvent of carbonate ester, information about the separation of LiFSI from other lithium salts in the slag, such as lithium sulphate ($Li_2SO_4$), lithium fluoride (LiF) and lithium sulphamate ($LiNH_2SO_3$), can be acquired by monitoring the chromaticity of the discharged liquid obtained by the solid-liquid separation.

In some embodiments, the chromaticity reference has a value of no more than 300 Hazen, optionally no more than 200 Hazen. The discharged liquid is recycled to the LiFSI production process, if the discharged liquid has a low chromaticity, which ensures that the solid-liquid separation is carried out thoroughly, thereby sufficiently reducing the amount of residual LiFSI in the solid slag, increasing the content of LiFSI in the discharged liquid recycled back to the LiFSI production process and thus improving the recovery and reuse of LiFSI. The single recovery rate of LiFSI from the slag can reach up to more than 85%, if the chromaticity reference is not greater than 300 Hazen. The single recovery rate of LiFSI from the slag can reach up to more than 92%, if the chromaticity reference is not greater than 200 Hazen.

In the present application, the type of the solvent of carbonate ester is not limited specifically, as long as it can dissolve LiFSI, and it can be selected by those skilled in the art according to actual requirements. In some embodiments, the solvent of carbonate ester is one or more of diethyl carbonate (DEC), ethyl methyl carbonate (EMC), dimethyl carbonate (DMC), ethylene carbonate (EC), and propylene carbonate (PC). In the present application, the type of the solvent of carbonate ester is not limited specifically, as long as it can dissolve LiFSI, and it can be selected by those skilled in the art according to actual requirements.

In the present application, the mass ratio of the slag to the solvent of carbonate ester is not limited specifically, as long as the LiFSI in the slag can be fully dissolved in the solvent of carbonate ester, and it can be selected by those skilled in the art according to actual requirements. In some embodiments, the mass ratio of the slag to the solvent of carbonate ester is 1:(1-5), optionally 1:(2-4).

In the present application, the specific method for solid-liquid separation is not limited specifically, as long as the solid-liquid separation of the mixed material can be achieved, and it can be selected by those skilled in the art according to actual requirements. In some embodiments, the solid-liquid separation is carried out by centrifugation. In some embodiments, the solid-liquid separation is carried out by filtration.

In some embodiments, the single recovery rate of bis(fluorosulfonyl)imide is no less than 85%.

According to the method of the present application, in the process for recovering LiFSI from the slag from the LiFSI production process by using a solvent of carbonate ester, information about the separation of LiFSI from other lithium salts in the slag, such as lithium sulphate ($Li_2SO_4$), lithium fluoride (LiF) and lithium sulphamate ($LiNH_2SO_3$), can be acquired by monitoring the chromaticity of the discharged liquid obtained by the solid-liquid separation. The discharged liquid is only recycled to the LiFSI production process, if the chromaticity of the discharged liquid is lower than or equal to a predetermined chromaticity reference, thereby enabling the recycling of residual LiFSI in the slag back to the production process and achieving a maximized recovery and reuse of LiFSI. Moreover, the impurities in the recovered material containing LiFSI, such as lithium sulphate ($Li_2SO_4$), lithium fluoride (LiF) and lithium sulphamate ($LiNH_2SO_3$), have been thoroughly removed. The solid slag obtained from the recovering process can be further processed, in order to recover the lithium salts, such as lithium sulphate ($Li_2SO_4$), lithium fluoride (LiF) and lithium sulphamate ($LiNH_2SO_3$), thus making full use of the lithium resource and reducing environmental pollution.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

LiFSI Production Process

As an example, the method of the present application for recovering LiFSI is applicable to the LiFSI production process including the following steps. A exemplary LiFSI production process will be described below with reference to the accompanying drawing in FIG. 1a, FIG. 1b and FIGS. 2-4.

Synthesis: Sulfuryl fluoride, ammonia and triethylamine are mixed thoroughly, so that sulfuryl fluoride and ammonia are fully reacted with each other, whereby triethylamine serves both as solvent and as reactant. Another organic solvent can also be used, such as acetonitrile, as solvent for the reaction. The main reaction is $SO_2F_2 + NH_3 + Et_3N \rightarrow (SO_2F-NH-SO_2F) Et_3N + Et_3N \cdot (HF)_n$ (n=1-12).

If the temperature in the reaction kettle is excessively high, the following side reaction will occur and influence the yield: $NH_3 + SO_2F_2 + Et_3N \rightarrow NH_2-SO_2-NH_2$ (sulfamide, solid)$+Et_3N \cdot (HF)_n$ (triethylamine hydrofluoride, soluble in $CH_3CN$, n=1-12). After the reaction, the side product of solid sulfamide can be filtered using a 5 μm polytetrafluoroethylene filter bag.

After the procedure of synthesis, the material comprises mainly ($SO_2F-NH-SO_2F$) $Et_3N$, acetonitrile, triethylamine hydrofluoride, a small amount of triethylamine, and impurity ions. The impurity ions comprises mainly $F^-$, $SO_4^{2-}$, $FSO_3^-$ and $Cl^-$.

Evaporation: The product mixture (material α1) is fed into an evaporator for separation of the solvent of acetonitrile through evaporation. The material can be subjected to heating by a falling film evaporator, separation of liquid from vapor through a gas-liquid separator, and condensation of acetonitrile vapor, which contains a small amount of triethylamine and is reused in the synthesis of the first step, by a condenser.

After the procedure of evaporation, the material comprises mainly ($SO_2F-NH-SO_2F$)·$Et_3N$, triethylamine hydrofluoride, a trace amount of acetonitrile, and impurity ions.

Extraction: The condensate obtained by evaporation (material α2) is washed with water, in order to remove the water-soluble impurities, mainly triethylamine hydrofluoride. For this purpose, two schemes can be adopted:

Scheme One: In a extraction tower with a middle spiral stirrer, the lighter phase (with lower density) enters from the bottom and exits from the top, and the heavier phase enters from the top and exits from the bottom. Scheme Two: Extraction with a static mixer and a separation tank. The extracted oil phase (material α3) mainly contains ($SO_2F-$ NH—SO$_2$F) Et$_3$N, and the extracted water phase (material α-water) mainly contains triethylamine hydrofluoride and impurity ions (such as F$^-$, SO$_4^{2-}$, FSO$_3^-$, Cl$^-$). In the scheme for extraction with the extraction tower, better separation of the impurity ions (like F$^-$) can be realized. In the scheme for extraction with the static mixer, the content of impurity ions in the oil phase obtained through extraction with the static mixer is 5-30 times, optionally 10-20 times that obtained through extraction with the extraction tower. Optionally, the impurity ion is F$^-$. In the LiFSI production process, the stage of synthesis, evaporation and extraction can be referred to as the section α, and for details of the procedure, reference can be made to the process flow chart in FIG. 1*a* (for the scheme with extraction tower) or FIG. 1*b* (for the scheme with static mixer) of the present application.

Alkalization: The extracted oil phase (material α3) obtained after the extraction is mixed and reacts with an aqueous solution of lithium hydroxide thoroughly. Here occurs reaction 2:(SO$_2$F—NH—SO$_2$F)·Et$_3$N+LiOH→(SO$_2$F—N—SO$_2$F)$^-$Li$^+$+Et$_3$N+H$_2$O. The principle for this reaction consists in the substitution of a weak base by a strong base. Since the basicity of LiOH is higher than that of triethylamine in (SO$_2$F—NH—SO$_2$F)·Et$_3$N, the triethylamine is substituted from the molecule. The triethylamine is removed by a falling film evaporator B, while LiOH reacts with (SO$_2$F—NH—SO$_2$F)·Et$_3$N to yield the lithium salt of LiFSI.

Dewatering: The reaction mixture (material β1) obtained through reaction 2 is dewatered using a falling film evaporator C. The water is entrained by an ester solvent without involving a chemical reaction. Since lithium salts have high water absorption, it would be impractical to reduce the moisture content to the target value simply by evaporation. By adding a large amount of ester solvent, the water absorption of the lithium salts can be decreased. The reduction of moisture content to the target requirement can be achieved by adding and evaporating the ester solvent at the same time. The ester solvent can be reused after purification in a recovery section. The ester solvent may include ethyl methyl carbonate (EMC), diethyl carbonate (DEC), dimethyl carbonate (DMC), etc. During the dewatering process, LiFSI also decomposes, generating side products of lithium sulphate (Li$_2$SO$_4$), lithium fluoride (LiF), lithium sulphamate (LiNH$_2$SO$_3$), etc. Before the subsequent process of desolvation, the solid side products should be separated out by filtration or centrifugation (for example, the solid slag should be removed by centrifugal settlement using for example, a scraper centrifuge or a disc centrifuge), to obtain a slag.

In addition to the above-mentioned side products of LiF, Li$_2$SO$_4$, lithium sulphamate, etc, a small amount of the product of LiFSI will also inevitably remain in the slag from the dewatering procedure. With the method for recovering LiFSI of the present application, the residual LiFSI in the slag can be recovered in any falling film evaporator.

Desolvation: The material after evaporation and dewatering (material β2) is desolvated in a falling film evaporator D and a scraper evaporator E, which are connected in series. The desolvation does not involve any reaction and is only used to remove the ester solvent by evaporation. Since the lithium salts are soluble in the ester solvent, the crystallization in a later phase would be impossible or only feasible at a very low rate, if the ester solvent is not evaporated to a certain extent (such as from 60%-65% to 30%). The ester solvent can be reused after purification in a recovery section. A crude product of LiFSI (material β3) with a low moisture content (for example, lower than 3000 ppm) is obtained after the desolvation procedure. In the LiFSI production process, the stage of alkalization, dewatering and desolvation can be referred to as the section β, and for details of the procedure, reference can be made to the process flow chart in FIG. 2 of the present application.

In the procedures of dewatering and desolvation, an aqueous solution of lithium hydroxide should be added continuously for maintaining the system at a weak basic condition with pH between 7 and 9 and thus avoiding the decomposition of the product of LiFSI during evaporation. During the desolvation procedure, water is introduced by adding the aqueous solution of lithium hydroxide, and therefore, DEC should be continuously added for carrying water away during the desolvation process.

Crystallization: Crystallization refers to the separation of a new phase in the form of a crystal, when a substance is in a non-equilibrium state. The material β3 is fed to a crystallization kettle, and dichloromethane is added. By exploiting the property of dichloromethane that it can dissolve the ester solvent but not LiFSI, LiFSI can be separated from the ester solvent by oversaturation and the growth of the crystal nucleus. The obtained mixture is fed to a dual functional device for filtration and washing, where the impurities attached to the surface of the LiFSI crystals are washed off. The ester solvent and dichloromethane can be reused after the purification of the crystallizing liquid in a recovery section.

Figure 1A:
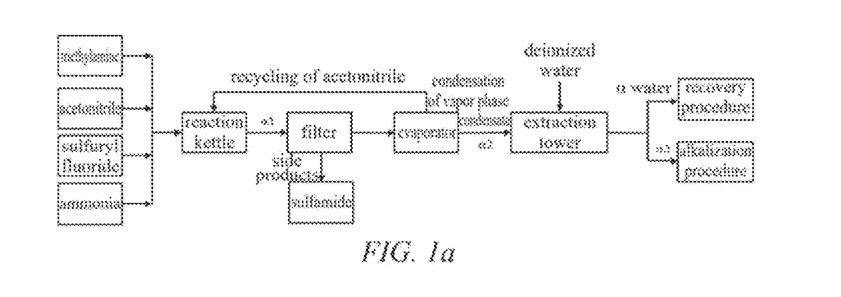
FIGS. 1a and 1b are process flow charts for section α in the LiFSI production process according to the embodiment of the present application.
Figure 1B:
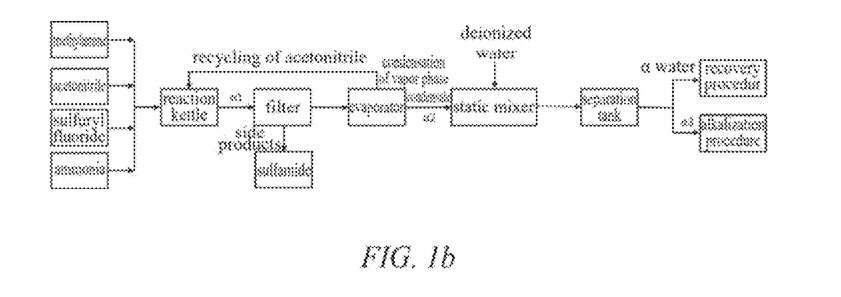
Figure 2:
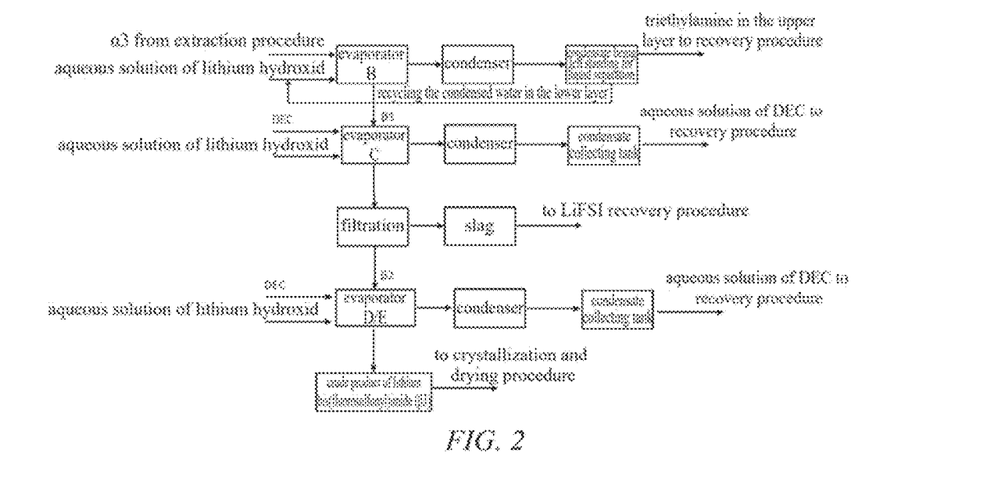
FIG. 2 is a process flow chart for section β in the LiFSI production process according to the embodiment of the present application.
Figure 3:
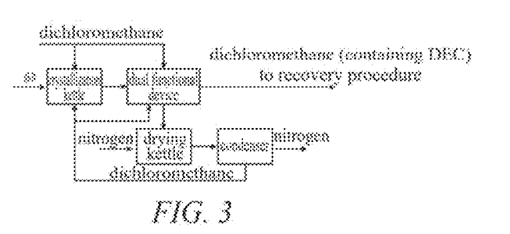
FIG. 3 is a process flow chart for crystallization and drying procedures in the LiFSI production process according to the embodiment of the present application.
Figure 4:
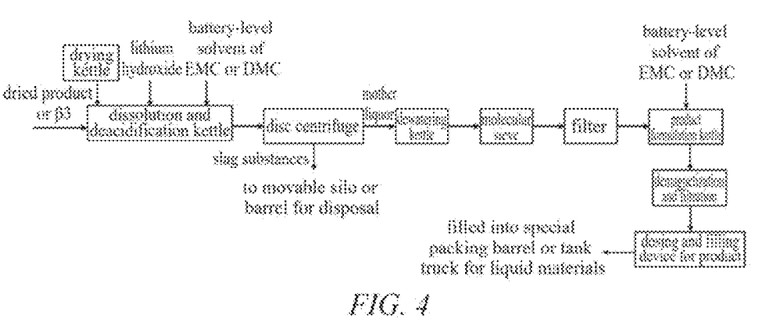
FIG. 4 is a process flow chart for dissolution procedure in the LiFSI production process according to the embodiment of the present application.

Although it is not shown in FIG. 2, a person skilled in the art may separate the solid side products by filtration or centrifugation before the dewatering procedure and/or the crystallization procedure according to actual requirements, in order to obtain the slag. These slags can also be used in the method for recovering LiFSI of the present application, and the recovered LiFSI can be recycled to any falling film evaporator.

Drying: The washed material is fed to a drying kettle. Nitrogen is heated and then fed to the drying kettle. The material is fluidized under stirring and the effect of the gas flow.

Through a large-area contact between the gaseous and solid phases, the moisture in the material evaporates rapidly and the nitrogen with high moisture content is discharged from the kettle, thereby drying the material to the required level. For details of the crystallization and drying procedures, reference can be made to the process flow chart in FIG. 3 of the present application.

In the LiFSI production process, the above-mentioned steps of crystallization and drying may be omitted, so that the material β3 is directly subjected to the dissolution procedure.

Dissolution: In the dissolution procedure, the above-mentioned crystals (for the method with crystallization) or the crude product β3 (for the method without crystallization) in the drying kettle can be subjected to dissolution using an ester solvent such as ethyl methyl carbonate (EMC) or dimethyl carbonate (DMC) according to requirements, acid removal (acid is removed by LiOH, if it is measured that HF in the solution exceeds a set standard, such as a standard of HF≤50 μg/g), and water removal (if it is measured that the water content in the solution exceeds a set standard, such as a standard of water content ≤20 μg/g).

The solution is passed through a molecular sieve, thickened, filtered through a filter cartridge, and stored (for example, in a barrel or in a tank truck). For details of the dissolution procedure, reference can be made to the process flow chart in FIG. 4 of the present application.

Measurement Methods (1) Method for Measuring Chromaticity

Firstly, a platinum-cobalt standard solution of 500 Hazen is formulated. In particular, 1.246 g of Potassium hexachloroplatinate ($K_2PtCl_6$) and 1.000 g of dry cobalt chloride hexahydrate ($CoCl_2 \cdot 6H_2O$) are weighed and dissolved in 100 mL of pure water. 100 mL hydrochloric acid ($\rho 20=1.19$ g/mL) is added and the solution is supplemented with pure water to a volume of 1000 mL, so that a platinum-cobalt standard solution of 500 Hazen is obtained. A series of standard solutions with different chromaticity (for example, 20 Hazen, 30 Hazen, 40 Hazen, etc.) is then formulated using the platinum-cobalt standard solution of 500 Hazen according to the equation V=N/5, wherein N represents the chromaticity (in Hazen) of the standard solution to be formulated and V represents the volume (in mL) of the standard solution of 500 Hazen that is needed for formulating 100 mL of such a standard solution.

The series of formulated platinum-cobalt standard solutions is respectively transferred to 50 mL colorimetric tubes and sequentially placed in a colorimetric tube rack according to the chromaticity. A white background is placed in a light source box. A sample of 25 mL is charged into a 50 mL colorimetric tube and placed at a middle bottom part of the light source box. The sample to be measured is compared with the platinum-cobalt standard solutions by observing with eyes along the axial direction of the colorimetric tube in the standard light source box. The chromaticity of the standard solution, which has the nearest deeper color than that of the sample to be measured, is recorded as the chromaticity of the sample.

(2) Method for Measuring the Amount of LiFSI

The LiFSI contents in the slag from the LiFSI production process and in the solid slag obtained by the recovering process of the present disclosure are measured by ion exchange chromatography (IC).

In particular, the measurement of mass proportion of LiFSI relative to the total mass of the slag or the solid slag is carried out on a chromatography apparatus (Dionex ICS-900, Thermo Fisher, U.S.A.) equipped with an ion exchange chromatographic column (analytic column: Shodex IC SI-90 4E, 4.6×250 mm, protective column: Shodex IC SI-90G, 4.6×10 mm). The operating parameters of the ion exchange chromatography are as follows: chromatographic column temperature: 30-45° C., detector: DS5 conductivity detector, eluent: 1.8 mmol $Na_2CO_3$+1.8 mmol $NaHCO_3$+ 20% acetonitrile (V/V), eluent flow rate: 1.0 mL/min, regenerant: 20 mmol $H_2SO_4$, regenerant flow rate: 1.0 mL/min.

(3) Method for Measuring the Content of Impurity Ions in Discharged Liquid

The contents of $SO_4^{2-}$ and $NH_2SO_3^-$ in the discharged liquid after solid-liquid separation are measured by ion exchange chromatography (IC).

In particular, the measurement of the contents of $SO_4^{2-}$ and $NH_2SO_3^-$ in the discharged liquid is carried out on a chromatography apparatus (Dionex ICS-900, Thermo Fisher, U.S.A.) equipped with an ion exchange chromatographic column (analytic column: Shodex IC SI-90 4E, 4.6×250 mm, protective column: Shodex IC SI-90G, 4.6×10 mm). The operating parameters of the ion exchange chromatography are as follows: chromatographic column temperature: 30-45° C., detector: DS5 conductivity detector, eluent: 1.8 mmol $Na_2CO_3$+1.8 mmol $NaHCO_3$+20% acetonitrile (V/V), eluent flow rate: 1.0 mL/min, regenerant: 20 mmol $H_2SO_4$, regenerant flow rate: 1.0 mL/min.

Example 1

A slag from LiFSI production process was stirred with an ester solvent of DEC at a mass ratio of 1:3 in a mixing kettle. A feeding valve for the ester solvent of the mixing kettle was opened for feeding DEC. The stirrer of the 10 m³ mixing kettle was turned on before feeding the slag. The slag and DEC were fed at a mass ratio of 1:3. After stirring for half an hour, the materials in the mixing kettle was centrifuged using a 2 m³ centrifuge (PLGZ-30000, Hongtong Petrochemical Equipment, Wuxi, China). In particular, a bottom valve of the mixing kettle and an outlet valve of a feeding pump of the centrifuge were opened, and the feeding pump of the centrifuge was turned on for feeding the materials to the centrifuge. After feeding, the centrifuge was turned on for centrifugation at a rotation speed of 12000 rpm, with an accelerating time of 120 s and a centrifugation time of 30 min. After the centrifugation, an discharging valve of the centrifuge and a venting valve of a storage tank for containing the discharged centrifuged liquid were opened for the collection of the discharged centrifuged liquid.

According to the chromaticity measurement method discussed above, the chromaticity of the discharged centrifuged liquid was monitored and compared with a chromaticity reference of 40 Hazen. If the chromaticity was greater than 40 Hazen, the discharged liquid was fed back to the mixing kettle for reprocessing; and if the chromaticity of the discharged liquid was smaller than or equal to 40 Hazen, the discharged liquid was returned directly to a falling film evaporator (such as the falling film evaporator B, C or D shown in FIG. 2) in the LiFSI production process.

Figure 5:
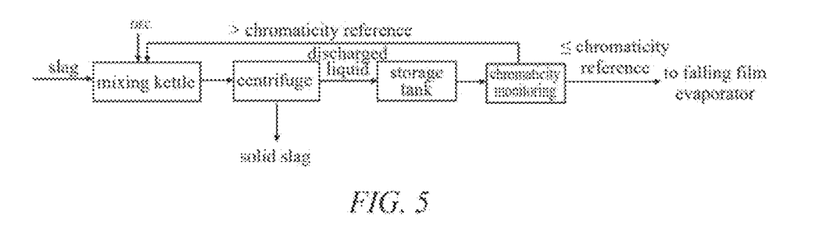
FIG. 5 is a process flow chart of the method for recovery according to Example 1.

For details of the method for recovering LiFSI according to Example 1, reference can be made to the process flow chart in FIG. 5 of the present application.

By using the measurement method discussed above, it was determined that the slag from the LiFSI production process contained 13.4 kg LiFSI. After the recovery described above, the content of LiFSI in the solid slag exiting the centrifuge only accounted for 0.4 kg. The single recovery rate of LiFSI was calculated to be 97.0% according to the following equation.

Single recovery rate of LiFSI=(1−content of LiFSI in solid slag after processing/content of LiFSI in slag before processing)×1000%

In addition, it was determined that the contents of $SO_4^{2-}$ and $NH_2SO_3^-$ in the discharged liquid exiting the centrifuge were 17.6 ppm and 15.6 ppm respectively.

Examples 2-17

The residual lithium bis(fluorosulfonyl)imide in the slag from the bis(fluorosulfonyl)imide production process was recycled to the LiFSI production process using a method that is substantially identical to that in Example 1, except that the chromaticity references shown in Table 1 are used for recovery.

According to the measurement methods described above, the content of LiFSI in the slag from the bis(fluorosulfonyl) imide production process, the content of LiFSI in the solid slag exiting the centrifuge after the recovery described above, and the contents of $SO_4^{2-}$ and $NH_2SO_3^-$ in the discharged liquid exiting the centrifuge were respectively measured and the single recovery rate of LiFSI was calculated. The results are shown in Table 1. The experiment results of example 1 are also listed in Table 1.

TABLE 1

| Examples | Chromaticity Reference | Discharged liquid Content of $SO_4^{2-}$ (ppm) | Discharged liquid Content of $NH_2SO_3^-$ (ppm) | before recovery Content of LiFSI in slag (kg) | after recovery Content of LiFSI in solid slag (kg) | LiFSI Single recovery rate |
|---|---|---|---|---|---|---|
| 1 | 40 | 17.6 | 15.6 | 13.4 | 0.4 | 97.0% |
| 2 | 60 | 23.8 | 17.9 | 12.7 | 0.4 | 96.9% |
| 3 | 80 | 28.9 | 19.4 | 13.6 | 0.5 | 96.3% |
| 4 | 100 | 34.2 | 22.3 | 13.0 | 0.6 | 95.4% |
| 5 | 120 | 44.5 | 28.7 | 12.2 | 0.6 | 95.1% |
| 6 | 140 | 56.1 | 34.9 | 12.6 | 0.7 | 94.4% |
| 7 | 160 | 88.3 | 50.4 | 12.8 | 0.8 | 93.8% |
| 8 | 180 | 91.2 | 66.9 | 13.1 | 0.9 | 93.1% |
| 9 | 200 | 96.8 | 69.8 | 13.7 | 1.0 | 92.7% |
| 10 | 220 | 132.3 | 107.1 | 12.5 | 1.2 | 90.4% |
| 11 | 240 | 140.5 | 114.3 | 12.4 | 1.2 | 90.3% |
| 12 | 260 | 148.7 | 122.7 | 13.1 | 1.3 | 90.1% |
| 13 | 280 | 153.4 | 133.4 | 13.6 | 1.4 | 89.7% |
| 14 | 300 | 166.9 | 135.6 | 13.9 | 1.5 | 89.2% |
| 15 | 310 | 453.7 | 266.1 | 13.2 | 2.4 | 81.8% |
| 16 | 320 | 512.6 | 284.7 | 12.9 | 2.7 | 79.1% |
| 17 | 330 | 587.3 | 311.1 | 13.8 | 3.1 | 77.5% |

The results of Examples 1 to 17 show that, during the recovery of LiFSI from the slag from the LiFSI production process using DEC, the chromaticity of the discharged liquid obtained by solid-liquid separation is monitored. If the chromaticity reference has a preferable value of not greater than 300 Hazen, the chromaticity of the discharged liquid obtained by solid-liquid separation is monitored, and the discharged liquid obtained by solid-liquid separation is only recycled to the LiFSI production process, if the chromaticity of the discharged liquid is lower than or equal to the preferable chromaticity reference, which enables the recycling of more than 85% of LiFSI in the slag back to the production process and in turn achieves a maximized recovery and reuse of LiFSI. Moreover, the impurities in the recovered discharged liquid, such as lithium sulphate ($Li_2SO_4$), lithium fluoride (LiF) and lithium sulphamate ($LiNH_2SO_3$), have been thoroughly removed, each having a content of lower than 200 ppm.

In Examples 1 to 17, if the chromaticity reference has a more preferable value of not greater than 200 Hazen, the chromaticity of the discharged liquid obtained by solid-liquid separation is monitored, and the discharged liquid obtained by solid-liquid separation is only recycled to the LiFSI production process, if the chromaticity of the discharged liquid is lower than or equal to the more preferable chromaticity reference, which enables the recycling of more than 92% of LiFSI in the slag back to the production process and in turn achieves a maximized recovery and reuse of LiFSI. Moreover, the impurities in the recovered discharged liquid, such as lithium sulphate ($Li_2SO_4$), lithium fluoride (LiF) and lithium sulphamate ($LiNH_2SO_3$), have been thoroughly removed, each having a content of lower than 100 ppm.

A person skilled in the art understands that the solid slag obtained from the recovering process of the present application can be further processed, in order to recover lithium salts, such as lithium sulphate ($Li_2SO_4$), lithium fluoride (LiF) and lithium sulphamate ($LiNH_2SO_3$), thus making full use of the lithium resource and further reducing environmental pollution.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

INDUSTRIAL APPLICABILITY

The method for recovering LiFSI of the present application is capable of recovering LiFSI from the slag from LiFSI production process, thus achieving maximized recovery and reuse of LiFSI, improving the yield of the LiFSI production process and reducing environmental pollution. Therefore, the present application is suitable for industrial applications.

The invention claimed is:

1. A method for recovering lithium bis(fluorosulfonyl) imide, comprising:
    mixing a slag from lithium bis(fluorosulfonyl)imide production process with a solvent of carbonate ester, to obtain a mixed material;
    subjecting the mixed material to solid-liquid separation, to obtain a discharged liquid and a solid slag;
    monitoring chromaticity of the discharged liquid and comparing the chromaticity of the discharged liquid with a chromaticity reference;
    recycling the discharged liquid to the mixed material, if the chromaticity of the discharged liquid is higher than the chromaticity reference; and
    recycling the discharged liquid to the lithium bis(fluorosulfonyl)imide production process, if the chromaticity of the discharged liquid is lower than or equal to the chromaticity reference.

2. The method according to claim 1, wherein the chromaticity reference has a value of no more than 300 Hazen.

3. The method according to claim 1, wherein the solvent of carbonate ester is one or more of diethyl carbonate (DEC), ethyl methyl carbonate (EMC) and dimethyl carbonate (DMC), ethylene carbonate (EC), or propylene carbonate (PC).

4. The method according to claim 1, wherein a mass ratio of the slag to the solvent of carbonate ester is 1:1 to 1:5.

5. The method according to claim 1, wherein the solid-liquid separation is carried out by centrifugation.

6. The method according to claim 1, wherein the solid-liquid separation is carried out by filtration.

7. The method according to claim 1, wherein a single recovery rate of bis(fluorosulfonyl)imide is no less than 85%,
    wherein the single recovery rate of bis(fluorosulfonyl) imide (LiFSI) is calculated according to below equation:

Single recovery rate of LiFSI=(1−content of LiFSI in the solid slag after processing/content of LiFSI in the slag before processing)×100%, and wherein the content of LiFSI in the solid slag after processing and the content of LiFSI in the slag before processing are measured by a chromatography technique.

8. The method according to claim 1, wherein the chromaticity reference has a value of no more than 300 Hazen and no less than 40 Hazen.

9. The method according to claim 1, wherein a single recovery rate of bis(fluorosulfonyl)imide is no less than 85% and no more than 97%, wherein the single recovery rate of bis(fluorosulfonyl)imide (LiFSI) is calculated according to below equation:

$$\text{Single recovery rate of LiFSI} = (1 - \text{content of LiFSI in the solid slag after processing}/\text{content of LiFSI in the slag before processing}) \times 100\%, \text{ and}$$

wherein the content of LiFSI in the solid slag after processing and the content of LiFSI in the slag before processing are measured by a chromatography technique.

* * * * *